United States Patent Office 3,817,739
Patented June 18, 1974

3,817,739
METHOD OF INHIBITING THE GROWTH OF ALGAE
Eugene A. Abbott, Freeland, Alan J. Isquith, Midland, and Patrick A. Walters, Freeland, Mich., assignors to Dow Corning Corporation, Midland, Mich.
No Drawing. Continuation-in-part of abandoned application Ser. No. 198,452, Nov. 12, 1971. This application Feb. 14, 1972, Ser. No. 226,288
Int. Cl. A01n 9/00
U.S. Cl. 71—67
5 Claims

ABSTRACT OF THE DISCLOSURE

The growth of algae can be retarded or prevented by bringing the algae in contact with a surface which is coated with an organosilicon compound of the unit formula

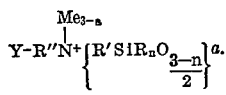

The method is particularly useful for preventing the growth of algae in aquariums by passing the aquarium water through a porous filter, the filter elements of which are coated with the siloxane. Specifically by continuously passing water of a household aquarium through a polyester filter, the filter element of which has been coated with the siloxane

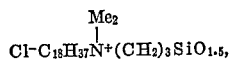

buildup of algae in the aquarium is prevented for an extended period of time.

---

This application is a continuation-in-part of applicants copending application Ser. No. 198,452, filed Nov. 12, 1971, now abandoned.

One of the perennial problems in water systems where the water at some point comes in contact with light, is a buildup of algae. Algae impart a slimy consistency to the water, coat the surfaces in the water system, thereby preventing proper exchange of heat, plug filters and otherwise create problems. Many efforts have been made to alleviate this problem. In general attempts have been made to control the growth of algae by adding a water soluble material to the water which would kill the algae in solution. At the present time the most commonly employed materials are herbicides which retard the growth of the algae. In many cases, however, the use of such herbicides is hazardous because the system also contains other living organisms which are harmed by the herbicide if the concentration exceeds a critical limit. In general, therefore, the amount of herbicide employable in such systems is so low that the buildup of algae is not retarded nearly as much as is desired.

Applicants copending application, Ser. No. 143,650, filed May 14, 1971, entitled "Method for Controlling the Growth of Algae in an Aqueous Medium," now U.S. 3,730,701, relates to a method of killing algae by adding quaternary ammonium silanes to water containing the algae. In this way not only are the growth of the algae prevented but also the algae present is flocculated so that it can be easily removed from the aqueous medium. Here again, this method while effective cannot be used in those applications in which the aqueous medium contains other organisms which are also harmed by the quaternary ammonium silane.

The present application relates to a new way of killing algae in which the toxic material is bonded to a surface. Algae are then killed by coming in contact with the surface. However, since the toxic ingredient is bonded to the surface it does not get into the aqueous medium per se and hence does not harm other plants or animals which may be living in the aqueous medium. Thus the present invention has a unique advantage over all previously known algicidal methods. In addition the amount of algicide required to treat a large volume of water is smaller than would be required if the algicide were added directly to the medium. For example, a filter can be treated in accordance to this invention and a large volume of water pass thereover so that any algae in the water are killed while coming in contact with the filter medium. Finally the killing of algae by the instant method prevents or greatly reduces the possibility of contamination of the environment with an unwanted chemical since the algicidal composition is bonded to a surface and does not escape into the environment from this surface.

Thus the object of this invention is to provide a novel method for killing or retarding the growth of algae which does not harm other organisms in the aqueous medium and which does not contaminate the environment.

This invention relates to a method of inhibiting the growth of algae which comprises contacting said organism with a solid material having bonded to the surface thereof, an algicidal amount of a coating consisting essentially of an organosilicon compound of the unit formula

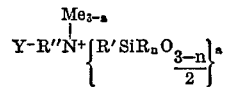

in which

Y is chlorine or bromine,
R'' is a methyl radical or an aliphatic hydrocarbon radical of from 11 to 22 carbon atoms,
R' is a divalent hydrocarbon radical of 1 to 10 carbon atoms,
R is a monovalent hydrocarbon radical of 1 to 6 carbon atoms or the $CF_3CH_2CH_2-$ radical,
n is an integer from 0 to 2, and
a is an integer from 1 to 2.

This invention also relates to a filter comprising a fibrous material, the fibers of which are coated with an algicidal amount of the above defined organopolysiloxane.

The quaternary ammonium organosiloxanes of this invention are known materials and they are prepared by hydrolysis of the corresponding hydrolyzable silanes which are also known. The surfaces employed in this invention can be coated in any desired manner. One can apply thereto a solvent solution of the siloxane and thereafter allow the coated material to air dry or one can follow the coating step with a heating step. Preferably, however, the substrates are coated with an aqueous solution of the organosilicon compound. These solutions are prepared by dissolving the corresponding hydrolyzable silanes in water at any desirable concentration. It has been found that concentrations of from 0.4 to 10% by weight siloxane in the treating bath give satisfactory results. The treated surface is then allowed to dry which causes a film of the siloxane to be deposited on the solid surface. If desired the surface can thereafter be heated at temperatures say from 65 to 100° C. or above in order to more firmly fix the siloxane to the surface. Also if desired, the well known siloxane condensation catalysts can be used to enhance the condensation of the siloxane and to fix it more firmly on the surface.

The amount of siloxane on the surface is not critical so long as there is sufficient amount to retard the growth of algae. In general, however, it has been found that if the solid surface is treated with a solution within the above concentration range, sufficient siloxane will be deposited thereon to effectively kill the algae. It should be understood, however, that such concentrations are not critical and the operativeness of this invention is in no way limited to their use.

The treating can be carried out with the quaternary ammonium compounds of this invention per se. Often, however, it is desirable to extend the compounds of this invention by incorporating therein hydrocarbon or halohydrocarbon substituted siloxanes of the formula $$R_a SiO_{\frac{4-a}{2}}$$

in which R is a hydrocarbon or halohydrocarbon radical and $a$ varies from 0 to 3. The incorporation of such siloxanes in no way effects the algicidal property of the quaternary ammonium compound so that the claims of this invention are construed to cover both the use of the quaternary ammonium siloxane per se and mixtures or copolymers of such siloxanes with said hydrocarbon substituted siloxanes or halohydrocarbon substituted siloxanes.

For example surfaces can be treated with an aqueous solution of a mixture of 10 mols of monomethyl trimethoxysilane and 1 mol of $$Cl^- C_{18}H_{37}Me_2N^+(CH_2)_3Si(OMe)_3$$

and the surface will be as algicidal as if it were treated with the quaternary siloxane alone. It has also been found that combinations of 1 mol $$Cl^- C_{18}H_{37}Me_2N^+(CH_2)_3Si(OMe)_3$$

and 0.5 mol of 3-chloropropyltrimethoxysilane give effective siloxane coatings. The use of hydrocarbon and halohydrocarbon siloxane extenders often give cheaper treatment than the pure quaternary siloxane.

For the purpose of this invention R″ can be the methyl radical or an aliphatic hydrocarbon radical of from 11 to 22 carbon atoms. The latter can be either saturated or unsaturated and can be either branch or linear in structure.

R′ can be any divalent hydrocarbon radical of from 1 to 10 carbon atoms such as alkylene radicals such as methylene, dimethylene, tetramethylene, decamethylene, isobutylene or isopentylene; cycloalkylene radicals such as cyclohexylene or $C_6H_8$; arylene hydrocarbon radicals such as phenylene or $$-\underset{\underset{Me}{|}}{C_6H_3}-$$

or alkarylene hydrocarbon radicals such as $-C_6H_4CH_2-$. Also R′ can be either saturated or unsaturated.

For the purpose of this invention R can be any aliphatic hydrocarbon radical of from 1 to 6 carbon atoms such as methyl, ethyl, isopropyl, or hexyl; alkenyl radicals such as vinyl, allyl, or hexenyl; the phenyl radical, cycloaliphatic radicals such as cyclohexyl, cyclopentyl or cyclohexenyl or the 3,3,3-trifluoropropyl radical.

The method of this invention can be carried out with any type of inert non-water soluble substrate. Thus the solid surface treated with the siloxane can be metal, wood, siliceous material, plastic or natural occurring materials. Specific examples of such substrates are metals such as steel, aluminum, copper, or lead; siliceous substrates such as glass, silica, aluminum silicate, calcium aluminum silicate, mica, asbestos, or stone; plastic substrates such as polyester, polyamide, cellulose acetate, rayon, polystyrene, polyvinylchloride, natural rubber, butadiene-styrene copolymers, polyethylene, polypropylene, alkyd resins, epoxy resins, polycarbonate resins, phenolic resins, and silicone resins; and naturally occurring organic materials such as wood, hemp, silk, wool, and cotton.

The method of this invention can be employed in any water system where the water is exposed to light at some stage so as to support algae growth. This includes, for example, cooling towers, aquariums and ponds for the disposal of sewage. In particular the process of this invention is adaptable for treating the filter medium in sewage disposal systems particularly with respect to the secondary treatment. In this treatment the effluent is pumped into ponds having sand or gravel bottoms and the water is allowed to filter through the bottom of the pond and disappear into the ground. One of the big problems in the present operation is that the sand filter soon becomes clogged with algae and will no longer function. As a result the pond must then be drained and the surface scraped to give a fresh sand surface before additional sewage can be filtered through. By treating the sand with the solutions of this invention such as by spraying, one can retard the growth of algae and therefore greatly prolong the life of the filter.

An especially adaptable use for this invention is in connection with household aquariums. Particularly those aquariums of the so called balanced type in which plants are growing in the aquarium. In such aquariums it is necessary to irradiate the water with sufficient light to support plant life. However, since algae are plants this greatly enhances the growth of algae in the aquarium so that within one or two weeks the algae growth is sufficient to necessitate changing the water. If, however, one circulates the aquarium water through a filter coated with the siloxanes of this invention the build up of algae can be prevented to such an extent that it is not necessary to change the water. As is well known, however, the amount of debris in a fish tank due to waste material from the fish and plant matter will generally clog a filter within 2 to 3 weeks. However, if a treated filter is used the growth of algae in the tank sufficient to cause discoloration of the water and disagreeable odors is retarded for the life of the filter. That is, it is retarded for a time at least sufficient so that the filter would have to be changed anyway due to the accumulation of debris therein. This same debris covers the siloxane coating and will eventually prevent the algae from being contacted by the toxic surface.

In addition to treating the filter one can also treat the sides of the tank and the gravel or sand in the bottom thereof. This prevents the growth of algae on the surface of the gravel and on the inside of the tank. It should be understood that the only algae which will be killed by the treated filter are those circulating in the water and actually coming in contact with the filter.

When the filter or the inside of the tank is properly treated so that the silicone material is firmly bonded thereto there is no harmful effect on the fish or other organisms in the aquarium.

The following examples are illustrative only and should not be construed as limiting the invention which is properly delineated in the appended claims. In the specification and claims Me is an abbreviation of the methyl radical and Ph of the phenyl radical.

EXAMPLE 1

This example shows the scope of the type of compounds operative in this invention. The test compounds shown below were applied in the form of a 1% by weight aqueous solution to the lower half of cleaned glass slides and allowed to air dry. The coated slides were then washed under running tap water for 15 to 60 minutes and redried. Using this method the upper portion of each slide served as an untreated control. The slides were embedded in a vertical position in paraffin floats and suspended in algal solutions. Each solution was placed in a covered aerated beaker under controlled constant illumination. The slides were removed from the solution in from 7 to 14 days and examined for growth and attachment of algae on both the treated and untreated portion of the slide. In each case the untreated portion of the slide was covered with algal growth whereas the treated portion was either clear of algal cells (as shown by microscopic examination) or it was demonstrated that the cells attached to the glass were nonviable on subsequent subculture. The killing of algae in solution was not observed indicating that the compounds were permanently attached to the slide surface.

For comparison glass slides were treated in like manner with a 1% solution of a mixture of benzyl dimethyl alkyl ammonium chlorides in which the alkyl groups contained from 8 to 18 carbon atoms. No algicidal activity was observed on the glass slide. The organosilicon compounds tested and found active are shown below.

$MeO(Me_2)SiCH_2N^+Me_2(C_{12}H_{25})Cl^-$
$(MeO)_2MeSiCH_2N^+(Me_2)C_{12}H_{25}Cl^-$
$(MeO)_2(CF_3CH_2CH_2)Si(CH_2)_3N^+(Me_2)C_{12}H_{25}Cl^-$
$(MeO)_2PhSi(CH_2)_3N^+(Me_2)C_{12}H_{25}Cl^-$
$(MeO)_3Si(CH_2)_3N^+Me_3Cl^-$
$\{(MeO)_3Si(CH_2)_3\}_2N^+(Me)C_{11}H_{23}Br^-$
$(MeO)_3Si(CH_2)_3N^+(Me_2)C_{12}H_{25}Cl^-$
$(MeO)_3Si(CH_2)_3N^+(Me_2)C_{12}H_{25}Br^-$

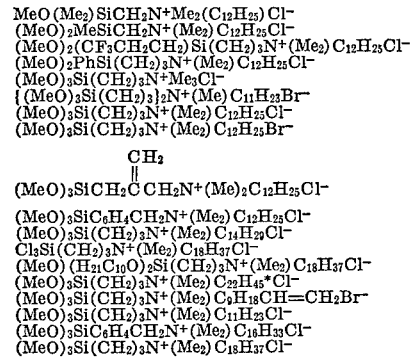

$(MeO)_3SiC_6H_4CH_2N^+(Me_2)C_{12}H_{25}Cl^-$
$(MeO)_3Si(CH_2)_3N^+(Me_2)C_{14}H_{29}Cl^-$
$Cl_3Si(CH_2)_3N^+(Me_2)C_{18}H_{37}Cl^-$
$(MeO)(H_{21}C_{10}O)_2Si(CH_2)_3N^+(Me_2)C_{18}H_{37}Cl^-$
$(MeO)_3Si(CH_2)_3N^+(Me_2)C_{22}H_{45}{}^*Cl^-$
$(MeO)_3Si(CH_2)_3N^+(Me_2)C_9H_{18}CH=CH_2Br^-$
$(MeO)_3Si(CH_2)_3N^+(Me_2)C_{11}H_{23}Cl^-$
$(MeO)_3SiC_6H_4CH_2N^+(Me_2)C_{16}H_{33}Cl^-$
$(MeO)_3Si(CH_2)_3N^+(Me_2)C_{18}H_{37}Cl^-$

*Actually a mixture of silanes in which the alkyl groups vary from $C_{20}$ to $C_{22}$ carbon atoms.

EXAMPLE 2

This example shows the efficacy of the method of this invention with various substrates. Each of the substrates shown below was impregnated with a 1% aqueous solution of the silanes shown below and the fibrous material squeezed free of excess solution and then allowed to air dry. Each of the treated fibrous materials was introduced into a circulating side mounted aquarium filter. The aquarium tanks were filled with aged tap water and aerated for 24 hours previous to attachment of the control and treated filters. The experiments were conducted in five gallon landscaped aquariums and each tank contained 15 liters of water and 3 species of fish. Each species was represented by 3 specimens. The fish were angel fish, neon tetra, and guppy. Each aquarium was inoculated with 1 cc. of an algal solution containing 300,000 cells per cc. All tanks were covered and continuously illuminated with a Gro-Lux® lamp. Normal tank maintenance included aeration, daily fish feeding, maintaining water level, etc. The following compounds were employed:

$(MeO)_3Si(CH_2)_3N^+(Me_2)C_{12}H_{25}Cl^-$
$(MeO)_3Si(CH_2)_3N^+(Me_2)C_{14}H_{29}Cl^-$
$(MeO)_3Si(CH_2)_3N^+(Me_2)C_{16}H_{33}Cl^-$
$(MeO)_3Si(CH_2)_3N^+(Me_2)C_{18}H_{37}Cl^-$
$(MeO)_3Si(CH_2)_3N^+(Me_2)(C_{20}H_{41}$ to $C_{22}H_{45})Cl^-$

Each of the following substrates was employed and in each case there was excellent algal control against a broad spectrum of algae kingdom including *Cyanophyta* (blue-green algae), *Chlorophyta* (green algae) and *Crysophyta* (yellow-green algae) and mixed populations thereof. The substrates were glass-wool, cotton, wool, linen, felt, acrylic, modacrylic, polyester, rayon, cellulose acetate, polyurethane, and vinyl alcohol-vinyl acetal copolymer.

EXAMPLE 3

This example shows the effectiveness of sand treated with the compositions of this invention to kill algae. Two columns were filled with sand having a particle size range of 4 to 5 mm. diameter. Into one column was passed a 1% aqueous solution of $(MeO)_3Si(CH_2)_3N^+(Me_2)C_{18}H_{37}Cl^-$ and into the other column was passed distilled water. Each column was allowed to air dry. Four liters of an algal solution containing 3,500,000 cells per cc. was circulated through each column for 24 hours. The effluent from each was then examined microscopically. The effluent from the soloxane coated sand showed 0 algae count while that from the distilled water treated sand showed 2,100,000 cells per cc. The drop in count in the blank was due to the filtering action of the sand.

EXAMPLE 4

This example gives a comparison between the use of the treated filters of this invention, the use of no treatment on the filter and the use of an untreated filter together with a commercial algicide in which the active ingredient is 3-(p,chlorophenyl) dimethyl urea. The algicide was used in tablet form and in the amount specified by the manufacturer. The filter employed in this experiment was polyester fluff and it was treated by immersing it in a 0.8% solution of $(MeO)_3Si(CH_2)_3N^+(Me_2)C_{18}H_{37}Cl^-$. The pH of the treating solution was varied in order to ascertain if pH has any appreciable affect on the durability or effectiveness of the coating. In each case the polyester was allowed to soak for 30 minutes and the fluff was then blotted and air dried. Each of the treated filters plus the controls were employed in five gallon aquariums and a triplicate run was made in each case.

The aquariums employed were first aerated and then water was circulated through an aquarium filter for 48 hours to remove the iron. Seven species of fist were introduced into these aquariums prior to introduction of the treated filters. The fish employed were marble hatchet
angel fish
guppy
coolie loach
cardinal tetra
bottom catfish
cherry barb.

Each aquarium was inoculated with 1 cc. of an algal solution containing 300,000 cells per cc. Daily aquarium maintenance, feeding, pH adjustment and water height adjustment was carried out and daily observations were recorded on the algal count. In no case was any fish toxicity observed. The results are shown in table below.

TABLE

| Days of treatment | Untreated filter | Untreated filter plus algicide | pH 3.8 | pH 7.1 | pH 9.0 |
|---|---|---|---|---|---|
| 0 | 0 | 0 | 0 | 0 | 0 |
| 1 | 1 | 0 | 0 | 0 | 0 |
| 2 | 2 | 0 | 0 | 0 | 0 |
| 3 | 2 | 0 | 1 | 0 | 0 |
| 4 | 3 | 1 | 2 | 0 | 0 |
| 5 | 44 | 17 | 4 | 1 | 4 |
| 6 | 62 | 21 | 9 | 1 | 1 |
| 7 | 66 | 27 | 22 | 3 | 5 |
| 8 | 73 | 36 | 38 | 2 | 11 |
| 9 | 142 | 69 | 38 | 7 | 10 |
| 10 | 146 | 83 | 41 | 20 | 16 |
| 11 | 108 | 81 | 35 | 17 | 20 |
| 12 | 113 | 80 | 67 | 42 | 31 |
| 13 | 108 | 104 | 73 | 54 | 40 |
| 14 | 134 | 102 | 74 | 81 | 79 |

An algae count of 0 means that there is less than 10,000 cells per cc. An algae count of above 100,000 cells per cc. becomes objectionable in the aquarium. From the above data it can be seen that the treated filters prevented algae buildup to an objectionable point twice as long as either the untreated filter or the untreated filter plus the algicide. It is also to be noted that there is only minor differences in algae control as between a pH of 3.8, 7.1 and 9.0. Slightly better results were obtained at a neutral pH or a slightly basic pH.

EXAMPLE 5

This example shows the practice of this invention does not deleteriously affect aquatic plants. A polyester fluff was treated in accordance with the previous example employing a 5% and a 1% respectively water solution of the silane employed in Example 4. Each of the filters was attached to a 10 gallon aquarium filled with aerated aged tap water and containing the common aquarium plants shown below:

*Elodea canadensia, E. ancharis*
Underwater banana plant
*Sagittaria microfolia*
*Corkscrew vallianeria*
*Cabomba*
*Vallisneria*
Parrot feather
*Myriophyllum*
*Seratopyllum*
Water sprite.

The water was circulated through the filter in these aquariums for 3 months and there was no adverse effect observed on any of the plant species.

EXAMPLE 6

This example shows the noncriticality of the concentration of the treating solution with respect to algicidal properties. Cellulose acetate fluff fibers were treated with aqueous solutions in concentrations shown below of a mixture of 1 mol $(MeO)_3Si(CH_2)_3N^+Me_2C_{18}H_{37}Cl^-$ and 0.5 mol $Cl(CH_2)_3Si(OMe)_3$. The silane mixture was added to the water in the form of a 50% solution in methanol and the aqueous solutions were allowed to stand for 30 minutes prior to treating the cellulose acetate. The cellulose acetate was soaked one minute in the solution then squeezed and blotted to 60% wet-weight pickup. All samples were oven dried 24 hours at 65° C. Each sample was then placed in an aquarium filter and each aquarium contained two angel fish, two guppies, and two cardinal tetras. The fish were preconditioned to the aquariums for three days prior to introduction of the treated filters. Each of the aquariums was inoculated with 1 cc. of an algae solution containing 300,000 cells per cc. For comparison, an untreated filter was employed in one of the aquariums. The algae buildup was followed daily and the results are shown in the table below.

TABLE

| Days | Control | 3.2 | 1.2 | 0.8 | 0.6 | 0.4 |
|---|---|---|---|---|---|---|
| 0 | 0 | 0 | 0 | 0 | 0 | 0 |
| 1 | 0 | 0 | 0 | 0 | 1 | 0 |
| 2 | 1 | 0 | 0 | 0 | 0 | 1 |
| 3 | 3 | 0 | 0 | 0 | 1 | 1 |
| 4 | 6 | 0 | 0 | 0 | 1 | 1 |
| 5 | 8 | 1 | 0 | 1 | 1 | 1 |
| 6 | 10 | 1 | 1 | 1 | 2 | 1 |
| 7 | 14 | 1 | 1 | 1 | 2 | 2 |
| 8 | 16 | 1 | 1 | 1 | 3 | 3 |
| 9 | 18 | 1 | 1 | 2 | 3 | 5 |
| 10 | 30 | 1 | 1 | 3 | 5 | 5 |
| 11 | 33 | 2 | 3 | 8 | 8 | 10 |
| 12 | 21 | 6 | 8 | 10 | 14 | 17 |
| 13 | 20 | 10 | 14 | 17 | 21 | 25 |
| 14 | 30 | 13 | 20 | 19 | 27 | 29 |

From this it can be seen that the concentration of the treating bath does not have an appreciable effect on the algicidal effectiveness of the filter.

It should be understood that in normal household operation the aquarium would not be deliberately contaminated with algae so that the life of the filter would be much longer.

EXAMPLE 7

Equivalent results are obtained when the following siloxanes are used in the procedure of Example 1. The siloxanes were formed on the glass surface using the corresponding methoxy silanes.

$Cl^-C_{18}H_{37}N^+(Me_2) C_6H_4SiO_{1.5}$
$Cl^-C_{18}H_{37}N^+(Me_2) C_6H_{10}SiO_{1.5}$
$Cl^-C_{18}H_{37}N^+(Me_2) C_{10}H_{20}SiO_{1.5}$
$Cl^-C_{18}H_{37}N^+(Me_2) (CH_2)_3Si(C_4H_9)O$
$Cl^-C_{18}H_{37}N^+(Me_2) (CH_2)_3Si(C_2H_3)O$
$Cl^-C_{18}H_{37}N^+(Me_2) (CH_2)_3Si(C_6H_{11})O$

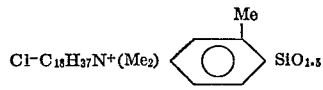

That which is claimed is:

1. A method of inhibiting the growth of algae which comprises contacting said organisms with an inert solid material having bonded to the surface thereof a coating consisting essentially of an algicidal amount of an organosilicon compound of the unit formula

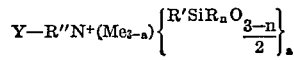

in which

Y is chlorine or bromine,
R" is a methyl radical or an aliphatic hydrocarbon radical of from 11 to 22 carbon atoms,
R' is a divalent hydrocarbon radical of from 1 to 10 carbon atoms,
R is a monovalent hydrocarbon radical of from 1 to 6 carbon atoms or a $CF_3CH_2CH_2-$ radical,
n is an integer from 0 to 2, and
a is an integer from 1 to 2.

2. The method in accordance with claim 1 in which the organosilicon compound is of the formula

3. The method of claim 1 in which the solid material is polyester fibers.

4. The method of claim 1 in which the solid material is cellulose acetate fibers.

5. The method of claim 1 in which the solid material is sand or gravel.

References Cited
UNITED STATES PATENTS

| | | | |
|---|---|---|---|
| 3,421,881 | 1/1969 | Leasure et al. | 71—79 |
| 3,366,673 | 1/1968 | Wakeman et al. | 71—67 |
| 2,247,711 | 7/1941 | Ralston et al. | 71—67 |
| 3,332,871 | 7/1967 | Robinson | 71—67 |
| 3,560,385 | 2/1971 | Roth | 260—49.6 |
| 2,355,822 | 8/1944 | Rugeley | 210—508 |
| 3,316,173 | 4/1967 | Mills et al. | 71—67 |
| 3,382,171 | 5/1968 | Mussell et al. | 71—67 |
| 3,730,701 | 5/1973 | Isquith et al. | 71—67 |

GLENNON H. HOLLRAH, Primary Examiner

U.S. Cl. X.R.

71—79; 210—503, 506, 607, 508, 509; 260—448.2 N, 448.8 R